US012705161B2

(12) United States Patent
Plate et al.

(10) Patent No.: US 12,705,161 B2
(45) **Date of Patent: *Aug. 11, 2026**

(54) DETERMINING AN IMPACT OF CHANGES TO THIRD-PARTY SOFTWARE COMPONENTS ON DOWNSTREAM USERS

(71) Applicant: Endor Labs Inc, Palo Alto, CA (US)

(72) Inventors: Henrik Plate, Valbonne (FR); Dimitrios Styliadis, San Jose, CA (US); Georgios Gousios, Delft (NL); Joseph Hejderup, Palo Alto, CA (US); Philip Hamer, Palo Alto, CA (US)

(73) Assignee: Endor Labs Inc, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/316,759

(22) Filed: Sep. 2, 2025

(65) Prior Publication Data

US 2026/0003765 A1 Jan. 1, 2026

Related U.S. Application Data

(63) Continuation of application No. 18/599,620, filed on Mar. 8, 2024, now Pat. No. 12,499,031.

(Continued)

(51) Int. Cl.
*G06F 11/3604* (2025.01)
*G06F 11/362* (2025.01)

(52) U.S. Cl.
CPC ...... *G06F 11/3604* (2013.01); *G06F 11/3636* (2013.01)

(58) Field of Classification Search
CPC ......................... G06F 11/3604; G06F 11/3636
See application file for complete search history.

(56) References Cited

U.S. PATENT DOCUMENTS 8,433,687 B1 4/2013 Pydi
8,627,327 B2 1/2014 Dunshea et al.

(Continued)

FOREIGN PATENT DOCUMENTS

CN 112083945 A 12/2020
CN 116842522 A 10/2023

(Continued)

OTHER PUBLICATIONS

Kamil Jezek et al., "API Evolution and Compatibility: A Data Corpus and Tool Evaluation," 2017 [retrieved Nov. 26, 2025], Journal of Object Technology, vol. 16, No. 4, pp. 1-23, downloaded from <url>:https://www.jot.fm/issues/issue_2017_04/article2.pdf. (Year: 2017).*

(Continued)

*Primary Examiner* — S. Sough
*Assistant Examiner* — Stephen D Berman
(74) *Attorney, Agent, or Firm* — Shiv S. Naimpally; Sikander Khan; Flagship Patents

(57) ABSTRACT

In some cases, a server determines that project code calls a component in a third-party library that has been updated. The server compares a first type hierarchy of the component with a second type hierarchy of the updated component, a first call graph of the component with a second call graph of the updated component, a first set of functions called by the component with a second set of functions called by the updated component, and a first set of fields (directly and transitively) accessed by the component with a second set of fields accessed by the updated component. The server determines, based on the comparisons, a set of breaking changes associated with the updated component. Each breaking change identifying changes to the updated component that may cause an incompatibility. The project code is modified (Continued)

to create modified project code that does not include a breaking change.

20 Claims, 7 Drawing Sheets

Related U.S. Application Data

(60) Provisional application No. 63/552,793, filed on Feb. 13, 2024, provisional application No. 63/627,281, filed on Jan. 31, 2024, provisional application No. 63/472,557, filed on Jun. 12, 2023, provisional application No. 63/472,562, filed on Jun. 12, 2023, provisional application No. 63/472,559, filed on Jun. 12, 2023, provisional application No. 63/472,561, filed on Jun. 12, 2023, provisional application No. 63/472,564, filed on Jun. 12, 2023.

(56) References Cited

U.S. PATENT DOCUMENTS

| | | | | |
|---|---|---|---|---|
| 9,064,134 | B1 | 6/2015 | Agarwal | |
| 10,108,975 | B1 | 10/2018 | Benner et al. | |
| 10,379,995 | B1 * | 8/2019 | Walters | G06F 16/2237 |
| 10,754,643 | B2 * | 8/2020 | Arquero | G06F 11/3457 |
| 11,204,690 | B1 | 12/2021 | Hoberman et al. | |
| 11,544,050 | B1 | 1/2023 | Ankit et al. | |
| 11,586,436 | B1 | 2/2023 | Jennings | |
| 11,704,099 | B1 | 7/2023 | Morse et al. | |
| 11,930,013 | B1 | 3/2024 | Zhang et al. | |
| 2002/0097253 | A1 | 7/2002 | Charisius et al. | |
| 2004/0168152 | A1 | 8/2004 | Kramer | |
| 2005/0055565 | A1 | 3/2005 | Fournet et al. | |
| 2006/0288055 | A1 | 12/2006 | Johnson et al. | |
| 2007/0294667 | A1 | 12/2007 | Caceres et al. | |
| 2010/0153908 | A1 * | 6/2010 | Sarkar | G06Q 10/06 717/104 |
| 2011/0055153 | A1 | 3/2011 | Hashimoto et al. | |
| 2011/0078674 | A1 * | 3/2011 | Ershov | G06F 8/75 717/170 |
| 2013/0083030 | A1 | 4/2013 | Fukuda et al. | |
| 2014/0013315 | A1 | 1/2014 | Genevski et al. | |
| 2014/0173574 | A1 | 6/2014 | Schmidt et al. | |
| 2014/0201573 | A1 | 7/2014 | Huang et al. | |
| 2014/0289697 | A1 | 9/2014 | Wenda et al. | |
| 2015/0169320 | A1 * | 6/2015 | Ahmed | G06F 8/71 717/122 |
| 2016/0253625 | A1 | 9/2016 | Casey | |
| 2016/0259636 | A1 | 9/2016 | Plate et al. | |
| 2017/0206123 | A1 | 7/2017 | Kirkpatrick | |
| 2017/0286099 | A1 | 10/2017 | Wilkinson | |
| 2018/0018459 | A1 | 1/2018 | Zhang et al. | |
| 2018/0239898 | A1 | 8/2018 | Haerterich et al. | |
| 2018/0314622 | A1 * | 11/2018 | Lowe | G06F 11/3616 |
| 2019/0042233 | A1 | 2/2019 | Majumdar et al. | |
| 2019/0272378 | A1 | 9/2019 | Hirvimies et al. | |
| 2019/0278572 | A1 | 9/2019 | Yoshida et al. | |
| 2020/0053175 | A1 | 2/2020 | Bodman et al. | |
| 2020/0073781 | A1 | 3/2020 | Falko | |
| 2020/0218535 | A1 | 7/2020 | Alomari | |
| 2021/0149667 | A1 | 5/2021 | Watson et al. | |
| 2021/0173621 | A1 | 6/2021 | Fender et al. | |
| 2021/0182037 | A1 | 6/2021 | Hu | |
| 2021/0182391 | A1 | 6/2021 | Plate | |
| 2021/0281597 | A1 | 9/2021 | Guiroux et al. | |
| 2022/0091842 | A1 | 3/2022 | Murray | |
| 2022/0342680 | A1 * | 10/2022 | Darke | G06F 11/3668 |

FOREIGN PATENT DOCUMENTS

| | | | |
|---|---|---|---|
| CN | 117556432 | A | 2/2024 |
| CN | 118467790 | A | 8/2024 |
| JP | 2011053966 | A | 3/2011 |

OTHER PUBLICATIONS

Danilo Silva et al., “RefDiff 2.0: A Multi-Language Refactoring Detection Tool,” 2021 [retrieved Jun. 23, 2025], IEEE Transactions on Software Engineering, vol. 47, Issue 12, pp. 2786-2802, downloaded from <url>:https://ieeexplore.ieee.org. (Year: 2021).*

Chaitanya Singh, “Multilevel inheritance in java with example,” 2022 [retrieved Nov. 24, 2025], pp. 1-3, downloaded from the Wayback Machine at <url>:https://web.archive.org/web/20220424092806/https://beginnersbook.com/2013/12/multilevel-inheritance-in-java-with-example/. (Year: 2022).*

Oracle, “The Java Tutorials: Inheritance,” 2020 [retrieved Nov. 25, 2025], pp. 1-4, downloaded from the Wayback Machine at <url>:https://web.archive.org/web/20200428224332/https://docs.oracle.com/javase/tutorial/java/landl/subclasses.html. (Year: 2020).*

Barthelemy Dagenais et al., SemDiff: Analysis and Recommendation Support for API Evolution, 2009 [retrieved Jun. 26, 2025], 2009 IEEE 31st International Conference on Software Engineering, pp. 599-602, downloaded from <url>:https://ieeexplore.ieee.org. (Year: 2009).*

Nikolaos Tsantalis et al., “RefactoringMiner 2.0,” 2022 [retrieved Jun. 27, 2025], IEEE Transactions on Software Engineering, vol. 48, Issue 3, pp. 930-950, downloaded from <url>:https://ieeexplore.ieee.org. (Year: 2022).*

Aline Brito et al., “APIDiff: Detecting API breaking changes,” 2018 [retrieved Jun. 22, 2025], 2018 IEEE 25th International Conference on Software Analysis, Evolution and Reengineering, pp. 507-511, downloaded from <url>:https://ieeexplore.ieee.org. (Year: 2018).*

Lina Ochoa et al., “BreakBot: Analyzing the Impact of Breaking Changes to Assist Library Evolution,” 2022 [retrieved Jun. 25, 2025], Proceedings of the ACM/IEEE 44th International Conference on Software Engineering: New Ideas and Emerging Results, pp. 26-30 , downloaded from <url>:https://dl.acm.org. (Year: 2022).*

Shahar Maoz et al., “CDDiff: Semantic Differencing for Class Diagrams”, 2011 [retrieved Mar. 6, 2026], pp. 230-254, downloaded from <url>:https://link.springer.com/chapter/10.1007/978-3-642-22655-7_12. (Year: 2011).*

Lyuye Zhang et al., “Has My Release Disobeyed Semantic Versioning? Static Detection Based on Semantic Differencing”, Jan. 5, 2023 [ retrieved Mar. 6, 2026], pp. 1-12, downloaded from <url>:https://dl.acm.org/doi/abs/10.1145/3551349.3556956. (Year: 2023).*

Xingliang Du et al., “AexPy: Detecting API Breaking Changes in Python Packages”, Dec. 21, 2022 [retrieved Mar. 6, 2026], pp. 470-481, downloaded from <url>:https://ieeexplore.ieee.org/abstract/document/9978982. (Year: 2022).*

Barthelemy Dagenais et al., SemDiff: Analysis and Recommendation Support for API Evolution, 2009 [retrieved Aug. 8, 2025], 2009 IEEE 31st International Conference on Software Engineering, pp. 599-602, downloaded from :https://ieeexplore.ieee.org. (Year: 2009).

Istvan-Attila Csaszar and Radu Razvan Slavescu (Interactive call graph generation for software projects); pp. 8; Published on IEEE in Nov. 26 (Year: 2020).

Mehdi Keshani (Scalable Call Graph Constructor for Maven); pp. 3; Published in Mar. 28 (Year: 2021).

Mehdi Keshani, Georgios Gousios and Sebastian Proksch (Frankenstein: fast and lightweight call graph generation for softwarebuilds); pp. 47; Published in Nov. 16 (Year: 2023).

Riivo Kikas, Georgios Gousios, Marlon Dumas, and Dietmar Pfahl (Structure and Evolution of Package Dependency Networks)pp. 11; Published on IEEE Jul. 3 (Year: 2017).

* cited by examiner

400

DETERMINE PROJECT CODE THAT USES, EITHER DIRECTLY OR INDIRECTLY, A SOFTWARE COMPONENT IN A 3RD PARTY LIBRARY
402

DETERMINE OTHER COMPONENTS IN THE THIRD PARTY LIBRARY THAT THE SOFTWARE COMPONENT USES (CALLS), DIRECTLY AND INDIRECTLY (E.G., TRANSITIVELY)
404

ACCESS A SET OF CANDIDATE BREAKING CHANGES (BC) ENCODING INFORMATION ABOUT CODE CHANGES BETWEEN A 1ST AND A 2ND VERSION OF SOFTWARE COMPONENT
406

DETERMINE A TYPE HIERARCHY AND A GLOBAL CALL GRAPH FOR THE PROJECT CODE AND DEPENDENCIES
408

FOR EACH CANDIDATE BC IN THE SET, DETERMINE WHETHER THE PROJECT CODE AND DEPENDENCIES ARE AFFECTED BY CHANGES MADE TO 2ND VERSION (INCOMING CALLS)
410

FOR EACH CANDIDATE BC IN THE SET, DETERMINE WHETHER THE CHANGES IN THE SECOND VERSION AFFECT OTHER 3RD PARTY COMPONENTS, PROJECT CODE, AND PROJECT CODE DEPENDENCIES (OUTGOING CALLS)
412

TRAVERSE TYPE HIERARCHY AND GLOBAL CALL GRAPH TO IDENTIFY (1) TYPES THAT INHERIT OR IMPLEMENT A TYPE THAT CHANGED FROM 1ST VERSION TO 2ND VERSION OF S/W COMPONENT, (2) FUNCTIONS THAT INVOKE A FUNCTION THAT CHANGED, AND (3) FUNCTIONS THAT ACCESS A CHANGED FIELD IN THE 2ND VERSION OF S/W COMPONENT
414

ANALYZE CHANGES IN THE SECOND VERSION TO DETERMINE WHETHER NEW OR CHANGED FUNCTION CALLS AND FIELD ACCESSES FROM REACHABLE PARTS CAN BE LINKED TO FUNCTIONS AND FIELDS IN THE PROJECT OR PROJECT DEPENDENCIES
416

ANALYZE CHANGES IN THE SECOND VERSION TO DETERMINE WHETHER NEW OR CHANGED TYPES OF REACHABLE TYPES IN THE SECOND VERSION ARE COMPATIBLE WITH EXTERNAL TYPES OF THE SECOND VERSION
418

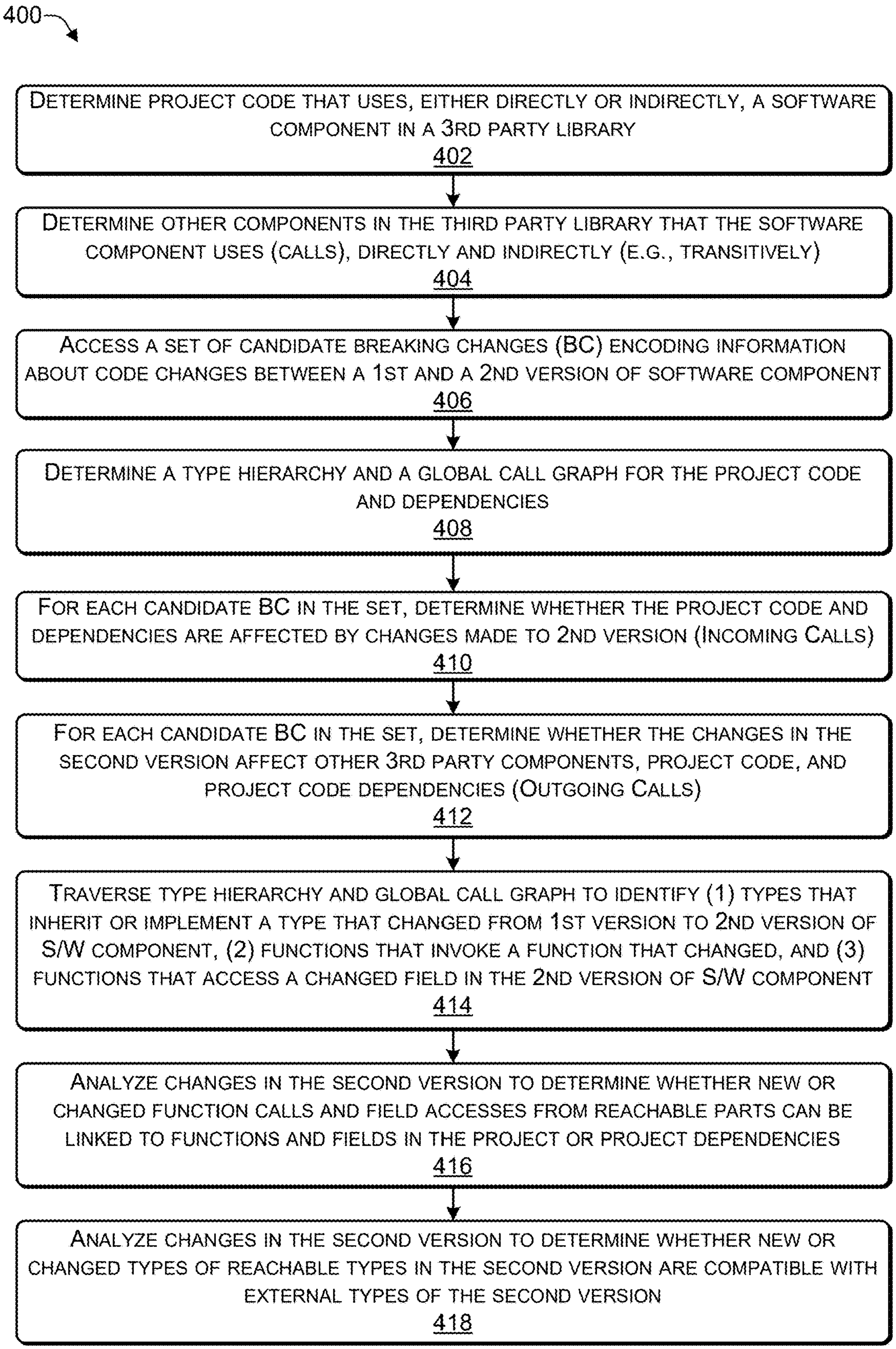

FIG. 4

DETERMINING AN IMPACT OF CHANGES TO THIRD-PARTY SOFTWARE COMPONENTS ON DOWNSTREAM USERS

CROSS-REFERENCE TO RELATED APPLICATIONS

The present non-provisional patent application is a continuation of U.S. Non-Provisional application Ser. No. 18/599,620 filed on Mar. 8, 2024 which claims priority to (1) U.S. Provisional Application 63/552,793 filed on Feb. 13, 2024, (2) U.S. Provisional Application 63/627,281 filed on Jan. 31, 2024, (3) U.S. Provisional Application 63/472,562 filed on Jun. 12, 2023 (4) U.S. Provisional Application 63/472,561 filed on Jun. 12, 2023 (5) U.S. Provisional Application 63/472,559 filed on Jun. 12, 2023 (6) U.S. Provisional Application 63/472,557 filed on Jun. 12, 2023 and (7) U.S. Provisional Application 63/472,564 filed on Jun. 12, 2023, all of which are incorporated herein by reference in their entirety and for all purposes as if completely and fully set forth herein.

BACKGROUND

Modern software applications comprise dozens, hundreds or even thousands of third-party components (components from third party libraries, such as open-source projects). A particular application may depend either directly, indirectly, or both on the third-party components. A direct dependency on a third-party component is declared by the application developer while an indirect dependency is a transitive dependency. For example, if component A calls component B and component B calls component C, then A-B and B-C are direct dependencies while A-C is an indirect dependency because A indirectly calls C.

The third-party components used by a particular application are typically developed by different, independent parties, e.g., open-source projects, and may have their own life cycle and release schedule. A new version of a third-party component can introduce new functionality, fix deficiencies (including security vulnerabilities) present in previous versions, introduce improvements (e.g., faster execution), and the like. The new version usually involves changing the component's code, such as by adding or removing functions, changing function implementations, adding or removing parameters to/from functions, narrowing or widening types, and the like.

In a library, new versions of components are typically provided by the original component manufacturer (e.g., open-source developer or other developer). Application developers may desire to update to a new version of a component to benefit from the security fixes, new functionality, and other improvements. However, the new version of the component may be incompatible with other parts of the application. For example, the new version of the component may be incompatible with the application (direct dependency) or incompatible with other third-party components (indirect dependencies) called by the application or by the new component. Whether such incompatibilities exist depends, in part, on the nature of the change in the updated component, and how the particular application uses the changed code in the new version of the component. The identification and resolution of such incompatibilities is labor-intense, which can make developers reluctant to perform updates. A change made in a new version of the component (i) that is incompatible with the application or other third-party components or (ii) that causes a change in the functionality of the particular application is called a breaking change because the change is said to have broken the functionality of the particular application.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some cases, a server determines that project code calls a component in a third-party library that has been updated. The server compares a first type hierarchy of the component with a second type hierarchy of the updated component, a first call graph of the component with a second call graph of the updated component, a first set of functions called by the component with a second set of functions called by the updated component, and a first set of fields (directly and transitively) accessed by the component with a second set of fields accessed by the updated component. The server determines, based on the comparisons, a set of breaking changes associated with the updated component. Each breaking change identifying changes to the updated component that may cause an incompatibility. The project code is modified to create modified project code that does not include a breaking change.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 4 is a flowchart of a process that includes traversing a type hierarchy and a call graph, according to some embodiments.

DETAILED DESCRIPTION

Figure 1:
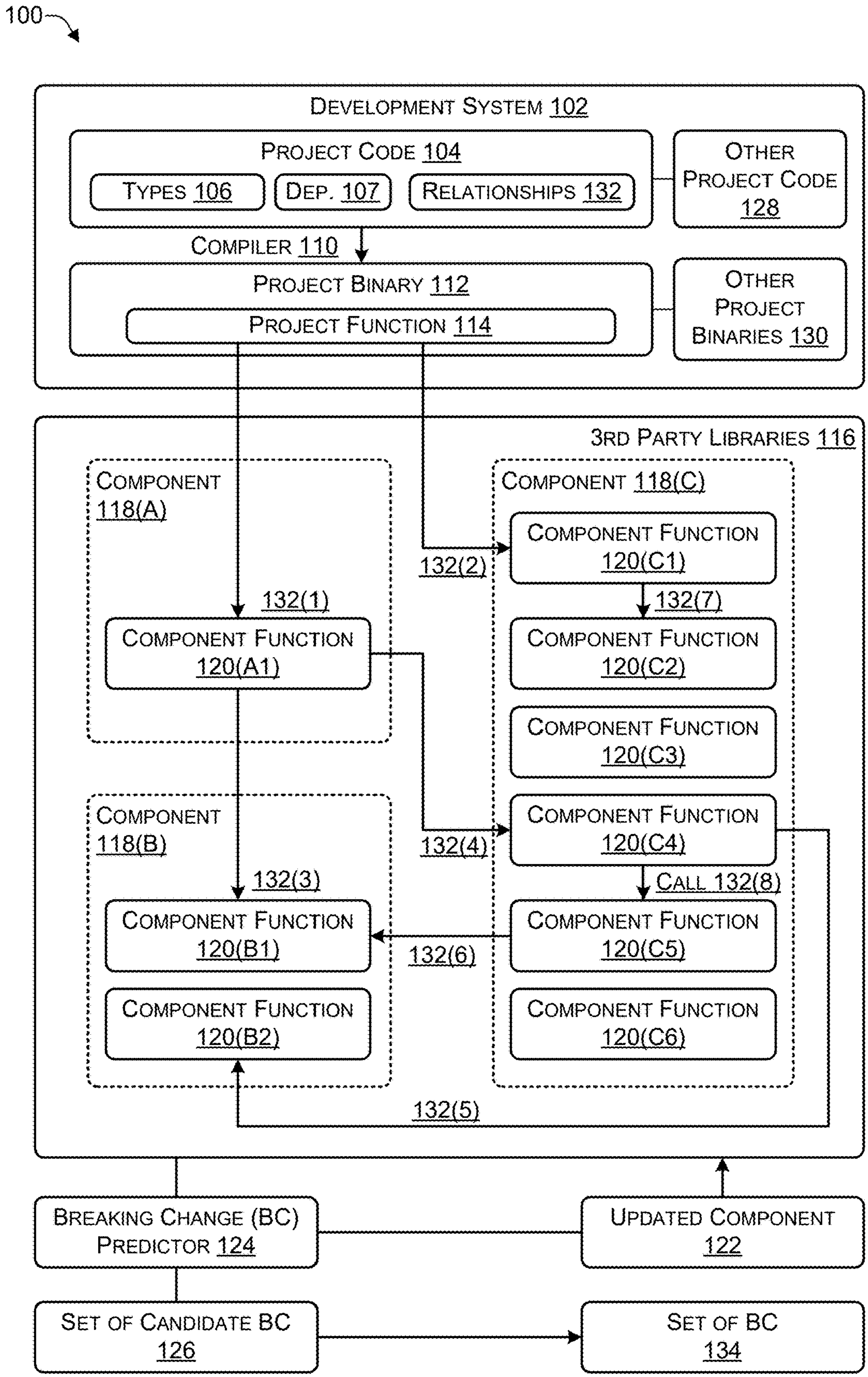
FIG. 1 is a block diagram of a system to predict whether an update to a component used by project code creates an incompatibility (breaking change), according to some embodiments.

The systems and techniques described herein analyze project code (a software application) that uses a component in a third-party library to determine whether an update (new version) of the component is predicted to result in an incompatibility (a breaking change), such as a loss of functionality. In some cases, an artificial intelligence algorithm (e.g., support vector machine or similar) may be used to analyze whether an updated component is predicted to cause an issue. The systems and techniques may determine a set of candidate (potential) breaking changes by analyzing and comparing two or more versions of individual components and evaluating each candidate in the set of candidate breaking changes in the context of a development project to determine a set of breaking changes in the project's specific content. The systems and techniques may create and analyze a type hierarchy and one or more call graphs (e.g., a package call graph and a global call graph) when determining the set of breaking changes.

The systems and techniques may look for multiple types of compatibility, including source compatibility, binary compatibility, and behavioral (semantic) compatibility between a component and an updated (newer) version of the component. In many modern languages, such as Java™, the source code is compiled to an intermediate code (also referred to as byte code) and the intermediate code is executed by a processor-specific virtual machine. The intermediate code is at a higher level than machine code and is processor agnostic. In this way, creating a processor-specific virtual machine for a particular processor enables devices with the particular processor to run (execute) a vast amount of previously compiled code. Typically, in many languages, (i) source compatibility may be checked by a compiler, (ii) binary compatibility may be checked by a virtual machine (e.g., Java Virtual Machine (JVM) during a linking process), and (iii) behavioral compatibility may be verified at runtime (when the VM is executing the compiled code) to determine whether the code exhibits a behavior that is different from previous version(s) of the code but does not cause compilation or linkage errors. Of course, languages that do not produce machine code (or intermediary code such as bytecode), or ecosystems in which components are distributed in source form (and recompiled in client contexts) may not have the same distinction between source compatibility and binary compatibility.

A new version (e.g., an update) of a component is said to introduce a breaking change (BC) if the changes introduced by the new version are source incompatible, binary incompatible, or behavior incompatible as compared to a current version (e.g., currently in use) of the component. Behavioral incompatibilities are typically detected by running an application and comparing an expected behavior (or output) with an actual behavior (or output).

As a first example, a server that includes a memory storage device storing instructions executable by one or more processors to perform various operations. The server compares two versions of the same component (e.g., a component and an updated component) and determines any potentially breaking changes in the context of a given project. The operations include determining that project code in a development system calls a component in a third-party library. The operations include determining that the component has been updated to create an updated component in the third-party library. The operations include determining a first type hierarchy associated with the component. The operations include determining a second type hierarchy associated with the updated component. The operations include performing a type hierarchy comparison of the first type hierarchy with the second type hierarchy. The operations include determining a first call graph associated with the component. The operations include determining a second call graph associated with the updated component. The operations include performing a call graph comparison of the first call graph with the second call graph. The operations include determining, based at least in part on (1) the type hierarchy comparison and (2) the call graph comparison, a set of breaking changes associated with the updated component. Each breaking change in the set of breaking changes identifies changes to the updated component, relative to the component, that are determined to cause an incompatibility between the project code and the updated component. The operations may include determining a first set of functions called by the component, determining a second set of functions called by the updated component, performing a function comparison of the first set of functions with the second set of functions, and determining, based at least in part on the function comparison, the type hierarchy comparison, and the call graph comparison, the set of breaking changes associated with the updated component. The operations may include (1) determining a first set of fields accessed by the component, (2) determining a second set of fields accessed by the updated component, (3) performing a field comparison of the first set of fields with the second set of fields, and (4) determining, based at least in part on the field comparison, the function comparison, the type hierarchy comparison, and the call graph comparison, the set of breaking changes associated with the updated component. For example, performing the type hierarchy comparison of the first type hierarchy with the second type hierarchy may include: (1) traversing the first type hierarchy, (2) traversing the second type hierarchy, and (3) identifying, based on traversing the first type hierarchy and the second type hierarchy, one or more types that inherit or implement at least one type that changed from the component to the updated component. As another example, performing the call graph hierarchy comparison of the first call graph with the second call graph may include: (1) traversing the first call graph, (2) traversing the second call graph, and (3) identifying, based on traversing the call graph and the second call graph, at least one function, included in the updated component, that changed from the component to the updated component. As yet another example, performing the call graph hierarchy comparison of the first call graph with the second call graph may include: (1) traversing the first call graph, (2) traversing the second call graph, and (3) identifying at least one function, called by the updated component, that changed from the component to the updated component. As a further example, performing the call graph hierarchy comparison of the first call graph with the second call graph may include: (1) traversing the first call graph, (2) traversing the second call graph, (3) identifying at least one field, and (4) accessed by the updated component, that changed from the component to the updated component.

As a second example, a server includes one or more processors and one or more non-transitory computer readable media storing instructions executable by the one or more processors to perform the following operations. The server compares two versions of the same component (e.g., a component and an updated component) and determines any potentially breaking changes in the context of a given project. The operations include determining that project code in a development system calls a component in a third-party library. The operations include determining that the component has been updated to create an updated component in the third-party library. The operations include determining a first type hierarchy associated with the component. The operations include determining a second type hierarchy associated with the updated component. The operations include performing a type hierarchy comparison of the first type hierarchy with the second type hierarchy.

The operations include determining a first call graph associated with the component. The operations include determining a second call graph associated with the updated component. The operations include performing a call graph comparison of the first call graph with the second call graph. The operations include determining based at least in part on the type hierarchy comparison and the call graph comparison a set of breaking changes associated with the updated component. Each breaking change in the set of breaking changes identifies changes to the updated component, relative to the component, that are determined to cause an incompatibility in response to the project code calling the updated component. The operations may include determining a first set of functions called by the component. The operations may include determining a second set of functions called by the updated component. The operations may include performing a function comparison of the first set of functions with the second set of functions. The operations may include determining, based at least in part on the function comparison, the type hierarchy comparison, and the call graph comparison, the set of breaking changes associated with the updated component. For example, performing the function comparison of the first set of functions with the second set of functions may include: (1) determining changes, between the component and the updated component, to function calls made by the updated component and (2) determining whether the changes to the function calls are linked to functions in the project or in project dependencies. The operations may include determining a first set of fields accessed by the component, determining a second set of fields accessed by the updated component, performing a field comparison of the first set of fields with the second set of fields, and determining, based at least in part on the field comparison, the function comparison, the type hierarchy comparison, and the call graph comparison, the set of breaking changes associated with the updated component. For example, performing the field comparison of the first set of fields with the second set of fields may include: (1) determining changes, between the component and the updated component, to particular fields accessible to the updated component and (2) determining whether the changes to the fields are linked to particular fields in the project or in project dependencies. The operations may include determining a set of reachable types in the updated component, performing a comparison of changes in the updated component relative to the component, and determining, based on the comparison, whether new types or changed types in the set of reachable types are compatible with external types associated with the updated component. The operations may include, for each breaking change in the set of breaking changes: (1) determining one or more locations in the project code affected by the incompatibility and (2) determining one or more actions to address the incompatibility.

As a third example, a server includes one or more non-transitory computer-readable media capable of storing instructions executable by one or more processors to perform the following operations. The server compares two versions of the same component (e.g., a component and an updated component) and determines any potentially breaking changes in the context of a given project. The operations include determining that project code in a development system calls a component in a third-party library. The operations include determining that the component has been updated to create an updated component in the third-party library. The operations include determining a first type hierarchy associated with the component. The operations include determining a second type hierarchy associated with the updated component. The operations include performing a type hierarchy comparison of the first type hierarchy with the second type hierarchy. The operations include determining a first call graph associated with the component. The operations include determining a second call graph associated with the updated component. The operations include performing a call graph comparison of the first call graph with the second call graph. The operations include determining based at least in part on the type hierarchy comparison and the call graph comparison a set of breaking changes associated with the updated component. Each breaking change in the set of breaking changes identifying changes to the updated component relative to the component that are determined to cause an incompatibility in response to the project code calling the updated component. The operations may include determining a first set of fields accessed by the component, determining a second set of fields accessed by the updated component, performing a field comparison of the first set of fields with the second set of fields, and determining, based at least in part on the field comparison, the function comparison, the type hierarchy comparison, and the call graph comparison, the set of breaking changes associated with the updated component. For example, performing the type hierarchy comparison of the first type hierarchy with the second type hierarchy may include: (1) traversing the first type hierarchy, (2) traversing the second type hierarchy, and (3) identifying, based on traversing the first type hierarchy and the second type hierarchy, one or more types that inherit or implement at least one type that changed from the component to the updated component. As another example, performing the call graph hierarchy comparison of the first call graph with the second call graph may include: (1) traversing the first call graph; traversing the second call graph and (2) identifying, based on traversing the call graph and the second call graph, at least one function, included in the updated component, that changed from the component to the updated component. The operations may include determining a set of reachable types in the updated component, performing a comparison of changes in the updated component relative to the component, and determining, based on the comparison, whether new types or changed types in the set of reachable types are compatible with external types associated with the updated component. For each breaking change in the set of breaking changes, the operations may include: (1) determining one or more locations in the project code affected by the incompatibility and (2) determining one or more actions to perform to address the incompatibility.

FIG. 1 is a block diagram of a system 100 to predict whether an update to a component used by project code creates an incompatibility (breaking change), according to some embodiments. The system 100 includes a development system 102 used by one or more programmers to create code, such as representative project code 104. The project code 104 is also referred to as source code and is written in a high-level language. The project code 104 may include types 106 that are explicitly defined and implicitly inherited. The project code 104 may include relationships 108 that are explicitly defined and implicitly inherited. FIG. 1 is merely an example to illustrate how the systems and techniques identify candidate breaking changes in project code 104 that uses components in one or more third-party libraries. It should be understood that in practice, the development system 102 may include multiple project code being developed and each project code, such as the representative project code 104, may include tens or even hundreds of calls to components in third-party libraries.

A compiler 110 may be used to compile the project code 104 to create a project binary 112. The project binary 112 may be an intermediate code (e.g., byte code) that is interpreted by a virtual machine, machine level code, or any combination thereof. The project binary 112 may implement at least one project function 114 to provide a particular type of functionality. The development system 102 may include other project code 128 and other project binaries 130 that are compiled versions of the other project code 128. The project code 104 may include relationships 132 (e.g., calls, inheritance, or other relationships) that reference other project code 128, e.g., the project code 104 may call and/or be called by the project code 128.

The project function 114 makes a call to one or more components in one or more third-party libraries 116. The one or more third-party libraries 116 may include open-source libraries or other types of libraries. Each component function 120 shown in FIG. 1 is a compiled file that is in a binary or intermediate code (e.g., bytecode) format. For illustration purposes, three components 118(A), 118(B), and 118(C) are shown in the third-party libraries 116. However, it should be understood that these are merely examples and that the project function 114 may use hundreds or even thousands of components accessible via third-party libraries 116. For illustration purposes, the component 118(A) includes at least a component function 120(A1), the component 118(B) includes a component function 120(B1) and 120(B2), and the component 118(C) includes component functions 120 (C1), 120(C2), 120(C3), 120(C4), 120(C5), and 120(C6). For illustration purposes, the components 118 are shown as being included in one or more third-part libraries 116. However, it should be understood that one or more of the components 118 may be included in the development system 102 rather than in the third-party libraries.

For illustration purposes, the project function 114 makes a call 132(1) to component function 120(A1) and a call 132(2) to component function 120(C1). The component function 120(A1) makes a call 132(3) to component function 120(B1) and a call 132(4) to component function 120(C4). The component function 120(C4) makes a call 132(5) to component function 120(B2). The component function 120 (C5) makes a call 132(6) to component function 120(B1). The component function 120(C1) makes a call 132(7) to component function 120(C2). The component function 120 (C4) makes a call 132(8) to component function 120(C5). The calls made by the component functions (e.g., component function 120(A1)) to other component functions (e.g., component function 120(B1) and component function 120 (C4)) are transitive calls from the perspective of the project function 114. For example, the component function 120(B1) is transitively called in two different paths: (1) the path comprising call 132(1) and call 132(3) and (2) the path comprising call 132(1), 132(4), 132(8), and 132(6). While 132 are referred to as calls herein, 132 references any type of relationship between two entities (e.g., either between the project function 114 and one of the component functions 120 or between two of the component functions 120), including, for example, calls, inheritance, field access, annotation, or another type of relationship.

An entity maintaining one of the third-party libraries 116 may create a new version of a component, updated component 122, that includes changes to address issues present in a currently available version of the component and to add functionality not found in the currently available version of the component. One concern for the developer of the project code 104 is whether the updated component 122 is a breaking change, e.g., does the updated component 122 change the way in which the project function 114 operates. Ideally, the developer wants the project code 104 to operate unaffected by the changes made to the updated component 122. However, due to the complexity of modern systems that use multiple components resulting in many, long transitive call paths, the updated component 122 may cause unintended and, often cases, undesirable effect on how the project function 114 operates. For example, the updated component 122 may cause at least a portion of the functionality of the project function 114 to stop working. As used herein, the term outgoing call refers to a call from the component 118(C) (or the updated component 122) to an external entity, such as, for example, another component (e.g., component 118(A), 118(B)) in the third-party libraries 116, to the project binary 112, or to the other project binaries 130. For example, the call 132(5) and 132(6) are outgoing calls. The term incoming call refers to a call from an external entity to the component 118(C) (or the updated component 122) such as, for example, a call from another component (e.g., component 118(A), 118(B)) in the third-party libraries 116, from the project binary 112, or from the other project binaries 130 to the component 118(C) (or the updated component 122). An example of an incoming call is the calls 132(2) and 132(4).

A breaking change (BC) predictor 124 that has access to the development system 102 and the third-party libraries 116 may analyze the updated component 122 to create a set of candidate breaking changes 126. The breaking change predictor 124 analyzes individual candidates in the set of candidate breaking changes 126 to identify a set of breaking changes 134 that are determined to cause an issue in the functionality of the project function 114. The breaking change predictor 124 may also provide suggestions on how to address each of the breaking changes in the set of breaking changes 134. In some cases, the breaking change predictor 124 may use an artificial intelligence algorithm to predict the set of candidate changes 126 or the set of breaking changes 134.

In the example illustrated in FIG. 1, the project code 104 calls three components 118(A), 118(B), and 118(C) in one or more third-party libraries 116. The dependencies may be managed by a package manager which resolves dependency declarations specified in files of the project code 104. The project code 104 is compiled using the compiler 110 to a project binary 112. The binaries of the components are downloaded from package registries (e.g., Maven Central) during a build process. The project code 104 (e.g., first-party code) is developed in a particular context and includes the types 106. Each type of the types 106 inherits a type defined in component 118(C) because project function 114 calls various components 120 in the third-party libraries 116. For example, the project function 114 calls component function 120(C1) and therefore inherits the appropriate types from the component function 120(C1). The project code 104 has relationships 108, as illustrated by 132, such as, for example, method invocation, class inheritance, annotation, interface implementation, field access and the like between other types and other functions included in components 118(A), 118(B), and 118(C).

The following example assumes that the updated component 122 updates component 118(*c*) from version N to version M (N>0, M>0, M not equal to N). Potentially, the updated component 122 may result in two types of incompatibilities: (1) incompatibilities due to incoming calls from the project function 114 and/or from one of the other components 118 that use (call) functions in component 118(C) and (2) incompatibilities due to outgoing calls from the updated component 122 to the project function 114 and/or to one of the other components 118. For example, an incompatibility associated with an incoming call occurs when component function 120(C1) is removed from the updated component 122, causing the call 132(2) to fail. As another example, an incompatibility associated with an incoming call occurs when a new method is added to a class type in the updated component 122, resulting in an incomplete class inheritance between the updated component 122 and the project code 104, causing the compilation to fail. As yet another example, an incompatibility associated with an outgoing call occurs when a new version of component function 120(C5) in the updated component 122 adds a call to a function that does not exist in component 118(B), resulting in the call to the non-existent function failing. While this example uses 132 as calls, 132 may alternately reference inheritance, field accesses, or other types of relationships as described herein.

Source code incompatibility and binary code compatibility may have different impacts depending on whether they occur between elements of the project code 104 and component 118(C), or between elements of other project dependencies 118(A) and 118(B) and component 118(C). Binary incompatibilities are usually less important for the project code 104 because the project code 104 is often recompiled into a new project binary as part of a new project build. Source code incompatibilities between the project code 104 and the updated component 122 can typically be resolved by modifying the project code 104. Binary incompatibilities are more important for relationships between the third-party components in the third-party libraries because they are usually not re-compiled (but instead downloaded from package registries). In some cases, binary incompatibilities can be resolved by updating the affected components in the third-party library.

Thus, project code in a development system may include calls to components (e.g., compiled bytecode or binaries) stored in third-party libraries. The call to a particular component in the third-party library may transitively result in calls to other components in the third-party libraries. When a component in the third-party library, two types of inconsistencies, resulting in a breaking change, may occur. First, incoming calls from the project code to the updated component may fail if a function called by the project code is absent or no longer works in the way it used to work. Second, outgoing calls from the updated component to other components in the third-party libraries may fail if a function in the updated component attempts to call a function in another component that is either absent or does not work in the way the call was intended to work. When an updated component is introduced, a breaking change predictor determines a set of breaking changes (compatibility issues) created by the updated component and may suggest ways to address the breaking changes.

Figure 2:
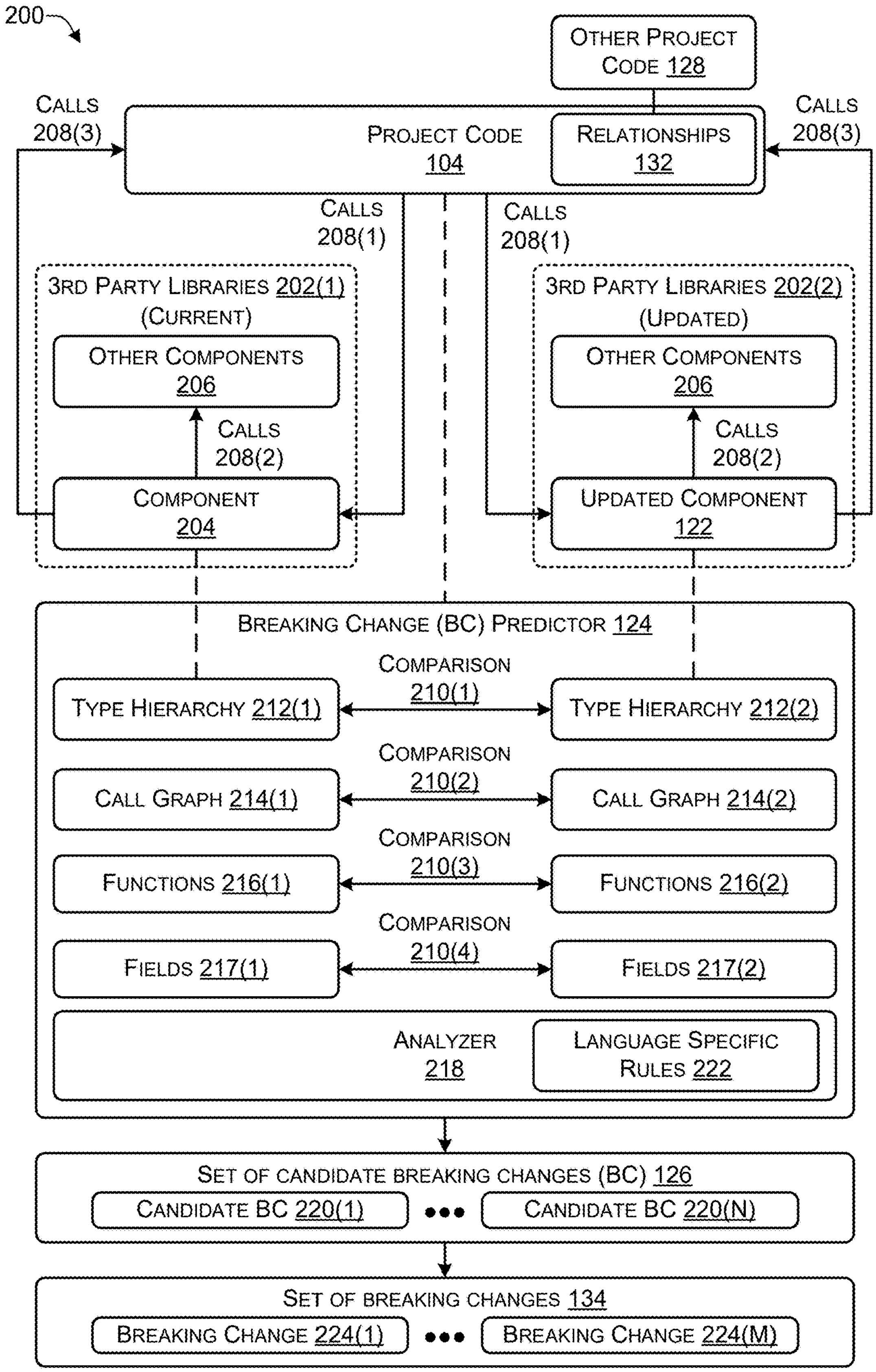
FIG. 2 is a block diagram of a system to determine a set of breaking changes associated with an updated component, according to some embodiments.

FIG. 2 is a block diagram of a system 200 to determine a set of breaking changes associated with an updated component, according to some embodiments. The system 200 illustrates in more detail how the breaking change predictor 124 creates the set of candidate breaking changes 126. In FIG. 2, the term outgoing call refers to a call from the component 204 or the updated component 122 to an external entity, such as, for example, one or more of the other components 206 in the third-party libraries 116, to the project code 112, or to other project code 128. For example, the call 208(2), 208(3) are outgoing calls. The term incoming call refers to a call from an external entity to the component 204 or the updated component 122 such as, for example, a call from one or more of the other components 206 in the third-party libraries 116, from the project code 104, or from the other project code 128. An example of an incoming call is the call 208(1).

The project code 104 makes calls to functions in components in third-party libraries. For example, current third-party libraries 202(1) may include a component 204 and other components 206. Updated third-party libraries 202(2) includes the updated component 122 and the other components 206. The project code 104 makes calls 208(1) that are outgoing to the component 204. The component 204 makes calls 208(2) that are outgoing to other components 206 and may, in some cases, make calls 208(3) that are outgoing to the project code 104 (and incoming for the project code 104).

Identifying the set of breaking changes 134 involves identifying the set of candidate breaking changes 126, e.g., without considering project context, and then identifying the set of breaking changes 134 from among the set of candidate breaking changes 126 by taking into account the project code 104 and associated context (e.g., the relationships 132 to external components). The breaking change predictor 124 may make one or more comparisons, such as the comparisons 210(1), 210(2), 210(3), 210(4). The comparison 210(1) compares a type hierarchy 212(1) of the current third-party libraries 202(1) with a type hierarchy 212(2) of the updated third-party libraries 202(2). The comparison 210(2) compares a call graph 214(1) of the current third-party libraries 202(1) with a call graph 214(2) of the updated third-party libraries 202(2). The comparison 210(3) compares functions 216(1) of the current third-party libraries 202(1) called by the component 204 with functions 216(2) of the updated third-party libraries 202(2) called by the updated component 122. The comparison 210(4) compares fields 217(1) of the current third-party libraries 202(1) accessed by the component 204 with fields 217(2) of the updated third-party libraries 202(2) accessed by the updated component 122. An analyzer 218 performs an analysis of the comparisons 210 to create the set of candidate breaking changes 126 that includes candidates BC 220(1) to 220(N). The analyzer 218 performs an analysis of each candidate in the set of candidate breaking changes 126 to determine the set of breaking changes 134 that the analyzer 218 has determined that the updated component 122 will cause some type of issue (incompatibility) for the project code 104.

The analyzer 218 combines multiple analysis techniques (described below) to detect incompatibilities between two versions of the same component, e.g., current component 204 and updated component 122, in the context of a particular project that includes the project code 104 (and corresponding binary or bytecode) and multiple components 206 in the third-party libraries.

Identify Candidate Breaking Changes

The analyzer 218 compares two versions of particular components, e.g., current component 204 and updated component 122, to create the set of candidate breaking changes 126, without regard to any particular project context (e.g., the project code 104). Every candidate BC is a potential incompatibility for any project that desires to change from the current component 204 to the updated component 122. The updated component 122 is a different version (could be an upgrade or a downgrade) of the current component 122. The breaking change predictor 124 performs the comparison 210(1) by comparing the type hierarchy 212(1) of the component 204 with the type hierarchy 212(2) of the updated component 122. The type hierarchies 212 describe types defined in the components 204, 122 as well as the relationships of the types, including class inheritance, interface implementation, method overrides, class, method or field annotations, method invocation, field access, and the like. The breaking change predictor 124 performs the comparison 210(1) by comparing (i) the package call graph 214(1) of the project code 104 and the current third-party libraries 202(1) with (ii) the package call graph 214(2) of the project code 104 and the updated third-party libraries 202 (2). Each of the package call graphs 214 describe all possible function invocations and field accesses (e.g., direct and indirect) that can take place when executing the code of the component 204 and the updated component 122. Each of the call graphs 214 may be constructed dynamically (e.g., while the component 204 or the updated component 122 are executing), statically (e.g., by tracing execution flow through the project code and the binaries/bytecode), or through a combination of both dynamic and static analysis. The comparison 210(2) considers types and functions defined by the components 204, 122 as well as the relationships of the types and functions to elements within and outside of the components 204, 122. Programming language specific rules 222 may be used because the type of elements to examine and the identification of candidate breaking may vary from one programming language to another programming language. For example, for the Java™ programming language, the comparison 210(2) of the call graphs 214 may include interface types, annotation types, class types, enum types, function signatures (including parameters, return arguments, exception clauses, access levels or other modifiers such as static or final), function bodies, and the like.

The breaking change predictor 124 creates a set of candidate breaking changes 126 that includes a candidate BC 220(1) to a candidate BC 220(N) (N>0). Each of the candidate BC 220 encodes information about the code that changed from the component 204 to the updated component 122. For example, each of the candidate breaking changes 220 may include change-related information, such as "method M removed from interface I", "an access level of method M changed from PUBLIC to PRIVATE", "field F changed from static to non-static", "method M added to interface I", "the body of method M changed" (e.g. its bytecode representation or abstract syntax tree changed, without specifying what specifically changed), "a new method call to external method M2 was added to the body of method M1", and so on. The analyzer 218 may categorize and group the candidate BC 220 in various ways, such as, for example, by a type of change being made (e.g., addition, removal, change, rename, or the like), or by a type of object that changed (e.g., type, field, function, or the like).

Evaluate Candidate Breaking Changes in the Context of a Particular Project

The analyzer 218 performs an analysis of each of the candidate BC 220 in the context of the project code 104 to determine an impact of each of the candidate BC 220 if the developer of the project code 104 plans to migrate from the component 204 to the updated component 122. The analyzer 218 analyzes the way the project code 104 and relationships 132 of the project code 104 to the component 204, such as, for example, (i) how the code changed (e.g., code delta) from the component 204 to the updated component 122, (ii) how the code that changed (e.g., code delta) is used by the project code 104, (iii) the use of types, functions, and fields introduced by the updated component 122 that may affect the project code 104 and dependencies 128 (e.g., code that calls or is called by) the project code 104). The analyzer 218 takes as inputs (1) the project code 104 that directly and/or indirectly uses the component 204 (and is planning to migrate to use the updated component 122), (2) the component 204, (3) the updated component, and (4) the code of the other components 206 used both directly and indirectly by the project code 104. The analyzer 218 analyzes the type hierarchies 212 describing types defined in the project code 104 and relationships 132 (including dependencies to components in the third-party libraries 202, such as the component 204 and the updated component 122), as well as the relationships 132 between the project code 104 and the components 118, such as, for example, class inheritance, interface implementation, method overrides, and the like. For example, a type definition of a class may include methods and fields, including modifiers, argument, return type, and the like. The analyzer 218 may construct and analyze global call graphs 214 describing all possible function invocations and field accesses that can take place when executing the project code 104. The call graphs 214 may be constructed dynamically, statically, or using any combination thereof. The analyzer 218 uses the inputs and the information obtained from the comparisons 210, the type hierarchies 212, the call graphs 214, and the functions 216 to (1) determine whether the project code 104 or the code of any of the components 120 which the project code 104 has the relationships 132 (excluding the updated component 122) makes use of code that is subject to changes included in the set of candidate breaking changes 126 (e.g., outgoing uses) and (2) changes associated with each of the candidate BC 220 that relate to elements outside of the updated component 122 that can be satisfied by code in the project or its dependencies. The analyzer 218 performs this analysis by (1) traversing the type hierarchy 212(1), 212(2) and the call graph to search and examine types declared in the project code 104 and in the other components 206 that inherit or implement a type that has been changed in the updated component 122, analyzing the functions 216(1), 216(2) in the project code 104 and in the other components 206 that invoke a function that changed in the updated component 122 relative to the component 204, and analyzing the fields 217(1), 217(2) in the project code 104 and in the other components 206 that accesses a field that changed in the updated component 122 relative to the component 204.

The analyzer 218 may examine changed elements in the candidate breaking changes 126 between the component 204 and the updated component 122 to determine whether new or changed relationships (e.g., functions calls to functions 216 and accesses to fields 217) from reachable parts in the updated component 122 (according to the global call graph 214(2)) can be linked to functions 216 and fields 217 in the project code 104 and relationships 132. Based on the type hierarchies 212(1), 212(2), the analyzer 218 determines whether new and changed types that can be reached by the updated component 122 are compatible with types external to the updated component 122. The analyzer 218 determines whether the candidate BCs 220 associated with the changed type, function, or field is incompatible at a source code level, at a binary (including bytecode) code level, at a behavioral level, or any combination thereof. A source code level incompatibility and a binary or bytecode incompatibility may vary according to how the changed type, function or field is used. For example, in Java™, if a type of a field is narrowed from the component 204 to the updated component 122, then read-access to the field is source and binary (e.g., bytecode) compatible but write-access to the field is incompatible. As another example, the removal of a function (in the updated component 122) in a base class that has been overridden in a subclass is source incompatible if the @Override annotation is used, and compatible if the @Override annotation is not used. As can be seen from those examples, the language specific rules 222 determining incompatibility may vary from one programming language to another. In most languages, source compatibility does not imply binary compatibility and binary compatibility does not imply source compatibility. During analysis of the individual candidate BCs 220, the analyzer 218 may apply one or more techniques to determine whether the project developers should be notified about a particular candidate breaking change 220 that is predicted to induce a change in behavior in the updated component 122 (relative to the component 204). An example of a technique to determine a change in behavior between the components 122, 204 may include determining a degree of change of a function body, expressed through distance measures, such as tree edit distances (e.g., determine over an abstract syntax tree (AST) representation) or textual function representations. Another example of a technique to determine a change in behavior between the components 122, 204, may include searching and interpreting release notes and documentation of the entire component, including types, functions, inline comments and the like to find indicators of semantic changes. A further example of a technique to determine a change in behavior between the components 122, 204 may include determining whether component types that are implemented or inherited in the project code 104 have changed, which can indicate semantic changes. Such techniques, along with particular thresholds for each technique, may be used to fine tune the capability of the analyzer to determine whether one of the candidate BC 220 is a breaking change that is to be included in the set of breaking changes 134.

The result of the analyzer 218 analyzing individual candidate BC 220 is the set of breaking changes 134 that identifies which of the candidate BCs 220 are predicted to cause an incompatibility issue (breaking change) if the project code 104 migrates from using the component 204 to using the updated component 122. Each breaking change 224(1) to 224(M) (M>0, M<=N) may provide information about the breaking change, such as, for example, (1) types of incompatibilities (e.g., source, binary, behavioral or any combination thereof), (2) an object affected by the incompatibility, where the object may belong to the project code 104 or to one or more of the relationships 132 not including (i) the component 204, or (ii) the updated component 122, (3) one or more locations of the affected source code location(s) affected, and remediation suggestions (if applicable). Note that source code incompatibility or binary code (include bytecode) incompatibility of the project code 104 can be addressed by the project developers, whereas incompatibilities in other relationships 132 may be addressed by updating or downgrading the affected component to a compatible version.

Simultaneous Update of Multiple Components

The systems and techniques described above are with reference to the update of a single component (e.g., component 204). However, it should be understood that the same techniques may be applied to identify and evaluate candidate breaking changes that result from the simultaneous update of multiple components in third-party libraries 202 used by the project code 104. The analyzer 218 may select multiple components for analysis. For example, a version update of a direct project dependency in a manifest file results in the automatic update of transitive (indirect) project dependencies, due to changes in the direct dependency's manifest file. A manifest file includes metadata for a set of accompanying files that are part of a set of files. For example, the manifest file may identify a name, a version number, a license, and constituent files of a program. As another example, an analysis of a single component's version update may identify binary incompatibilities which can be resolved through the update of the affected component. As a further example, a project developer may update multiple components simultaneously, e.g. to resolve a known vulnerability present in each of the multiple components. The analyzer 218 can analyze multiple components together (at the same time) because the systems and techniques described herein work at the granularity of single types, functions, or fields and their corresponding relationships. Whether those elements (types, functions, fields) are part of the same or different components is a secondary consideration and may be accounted for using simple element metadata (attached to those elements) or as part of unique element identifiers. The identification and evaluation of the candidate BC 220 assumes that a set of elements is updated without regard to the components from which they came.

Thus, a breaking change predictor may perform an analysis of (i) project code, (ii) a component (in a third-party library) used by the project code, (iii) an updated version of the component, and (iv) other components used by the component and the updated version of the component. The analysis may include performing a comparison of type hierarchies, call graphs, functions, and fields associated with the project code, the component, the updated component, and other components. The analysis may use language specific rules to determine incompatibilities arising at the source code level, the binary code (bytecode) level, and behavioral level. In this way, a project developer who is developing project code that uses the component and is interested in migrating to use the updated component can determine whether using the updated component will cause inconsistencies that result in the updated component breaking the project code, e.g., causing the project code not to function as intended. In some cases, the analysis may suggest ways in which to address the inconsistencies.

In the flow diagrams of FIGS. 3, 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, 500, and 600 are described with reference to FIGS. 1 and 2 as described above, although other models, frameworks, systems and environments may be used to implement these processes.

Figure 3:
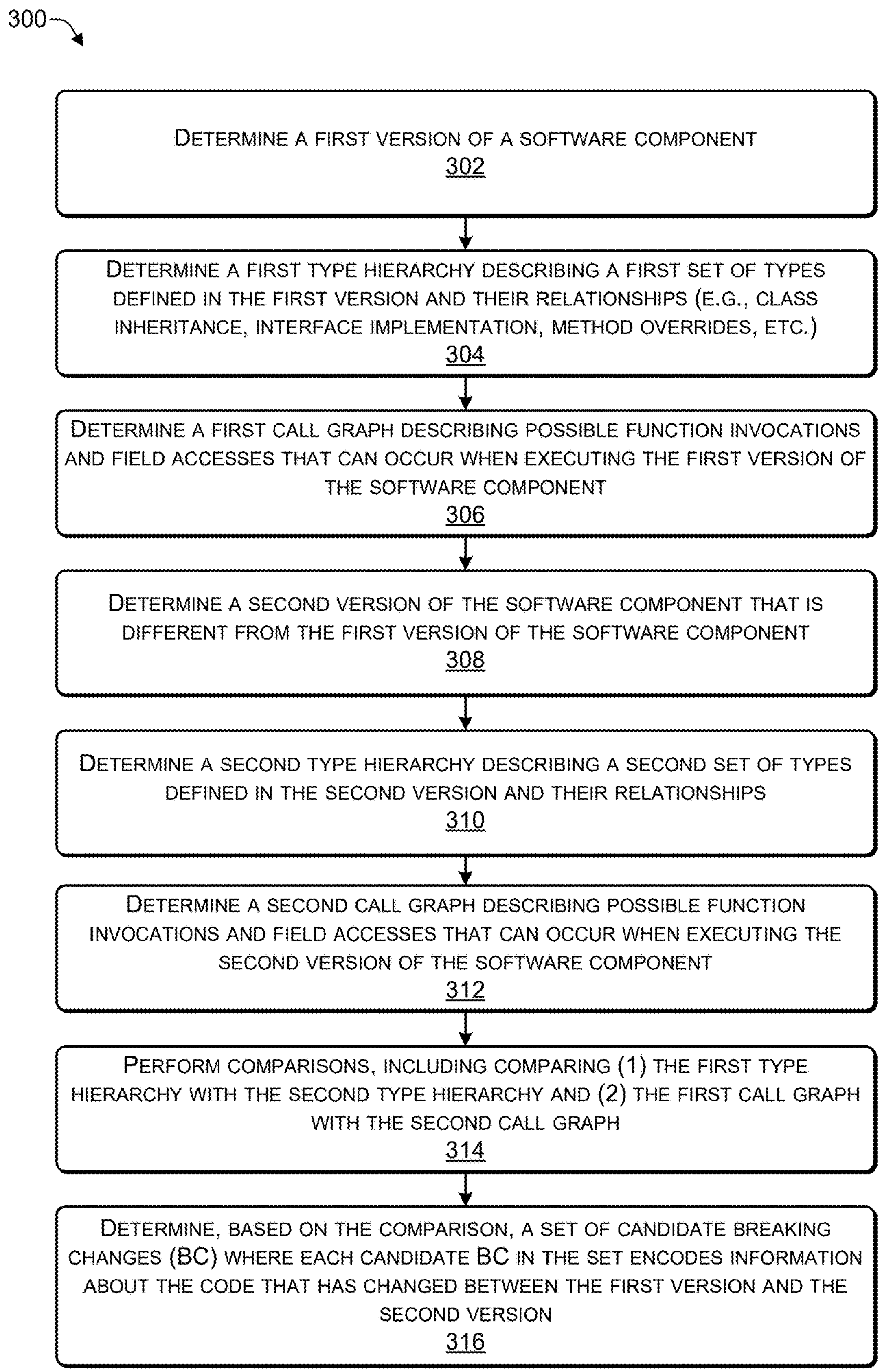
FIG. 3 is a flowchart of a process that includes determining a set of breaking changes, according to some embodiments.

FIG. 3 is a flowchart of a process 300 that includes determining a set of breaking changes, according to some embodiments. The process 300 may be performed by the breaking change predictor 124 of FIGS. 1 and 2.

At 302, the process may determine a first (e.g., current) version of a software component. At 304, the process may determine a first type hierarchy describing a first set of types defined in the first version of the software component and the relationships (e.g., class inheritance, interface implementation, method overrides, and the like). At 306, the process may determine a first call graph describing possible function invocations and field accesses that can occur when executing the first version of the software component. For example, in FIG. 2, the analyzer 218 may determine the current component 204 that is being used by the project code 104 and determine the type hierarchy 212(1) and the call graph 214(1) associated with the current component 204.

At 308, the process may determine a second version of the software component that is different from the first version of the software component. At 310, the process may determine a second type hierarchy describing a second set of types defined in the second version of the software component and their corresponding relationships. At 312, the process may determine a second call graph describing possible function invocations and field accesses that can occur when executing the second version of the software component. For example, in FIG. 2, the analyzer 218 may determine the updated component 122 that the project code 104 may migrate to using and determine the type hierarchy 212(2) and the call graph 214(2) associated with the updated component 122. The second version of the software component may be an upgrade, a downgrade, or any combination thereof.

At 314, the process may perform a comparison of (i) the first type hierarchy with the second type hierarchy and (ii) the first call graph with the second call graph. At 316, the process may determine, based on the comparison, a set of candidate breaking changes (BC) where each candidate BC in the set encodes information about the code that is changed between the first version of the software component and the second version of the software component. For example, in FIG. 2, the analyzer 218 may perform the comparisons 210, such as the comparison (a) 210(1) that compares the type hierarchy 212(1) with the type hierarchy 212(2), (b) the comparison 210(2) that compares the call graph 214(1) with a call graph 214(2), (c) the comparison 210(3) that compares the functions 216(1) with the functions 216(2), (d) the comparison 210(4) that compares the fields 217(1) with the fields 217(2), or (e) any combination thereof. The analyzer 218 may determine the set of candidate breaking changes 126 based on the comparisons 210.

Thus, project code using a particular component in a third-party library may be modified to use an updated (e.g., different) version of the particular component ("updated component"), an analyzer may perform an analysis of the particular component and the updated component, including, for example, an analysis of (i) a type hierarchy associated with the particular component and the updated component, (ii) a call graph associated with the particular component and the updated component, (iii) functions associated with the particular component in the updated component, (iv) fields associated with the particular component and the updated component, or (v) any combination thereof. Based on the analysis, the analyzer may create a set of candidate breaking changes that are candidates for breaking the project code if the project code were to migrate to using the updated component. In this way, a project developer can assess the ramifications of migrating the project code to use the updated component, including possible issues that may arise as a result of migrating the project code to use the updated component.

FIG. 4 is a flowchart of a process 400 that includes traversing a type hierarchy and a call graph, according to some embodiments. The process 400 may be performed by the analyzer 218 of FIGS. 1 and 2.

At 402, the process may determine project code that uses, either directly or indirectly, a software component in a third-party library. At 404, the process may determine other components in the third-party library that the software component uses (calls) directly and indirectly (transitively). At 406, the process may access a set of candidate breaking changes encoding information about code changes between a first and a second version of the software component (e.g., the output of FIG. 3). At 408, the process may determine a type hierarchy and a global call graph for the project code and dependencies. For example, in FIG. 2, the analyzer 218 may determine the project code 104 that uses the updated component 122 in the third-party library 202. The analyzer 218 may determine the other components 206 that are called, either directly or indirectly (transitively), by the updated component 122. The analyzer 218 may access the set of candidate breaking changes 126 (e.g., the output of FIG. 3), where each candidate BC 220 encodes information about code changes between the component 204 (first version) and the updated component 122 (second version). The analyzer 218 may determine the type hierarchy 212 and the global call graph 214 for the project code 104 and the relationships 132.

At 410, the process may, for each candidate BC in the set, determine whether the project code and dependencies are affected by changes made to the second version of the software component (incoming calls). At 412, the process may, for each candidate BC in the set, determine whether the changes in the second version affect other third-party components, project code, and project code dependencies (outgoing calls). For example, in FIG. 2, for each of the candidate BC 220, the analyzer 218 may determine whether the project code 104 and the relationships 132 are affected by changes made to the updated component 122 (incoming calls to the updated component 122). For each of the candidate BC 220, the analyzer 218 may determine whether the changes made to the updated component 122 (second version) affect other third-party components 206, project code 104, and project code dependencies 108 (outgoing calls from the updated component 122).

At 414, the process may traverse the type hierarchy and the global call graph to identify (1) types that inherit or implement a type that changed from the first version to the second version of the software component, (2) functions that invoke a function that changed, and (3) functions that access a changed field in the second version of the software component. At 416, the process may review changes in the second version of the software component to determine whether new or changed function calls and field accesses from reachable parts can be linked to functions in fields in the project or project dependencies. At 418, the process may review changes in the second version of the software component to determine whether new or changed types of reachable types in the second version are compatible with external types of the second version of the software component. For example, in FIG. 2, the analyzer 218 may traverse the type hierarchy 212 and the global call graph 214 to identify (1) types that inherit or implement a type that changed from the component 204 (first version) to the updated component 122 (second version), (2) functions 216 that invoke a function that changed from the component 204 (first version) to the updated component 122 (second version), and (3) functions that access a changed field 217 in the updated component 122 (second version). The analyzer 218 may analyze changes in the updated component 122 (second version) to determine whether new or changed function calls 216(2) and field accesses 217(2) are from reachable parts and can be linked to functions in fields 217 in the project code 104 or project relationships 132. The analyzer 218 may analyze changes in the updated component 122 (second version) to determine whether new or changed types (of reachable types) in the updated component 122 are compatible with external types of the updated component 122.

Thus, an analyzer may analyze project code that uses a particular component in a third-party library that has an updated (e.g., different) version of the particular component ("updated component") available. The analyzer may perform an analysis of the particular component and the updated component, including, for example, an analysis of (i) a type hierarchy associated with the particular component and the updated component, (ii) a call graph associated with the particular component and the updated component, (iii) functions associated with the particular component in the updated component, (iv) fields associated with the particular component and the updated component, or (v) any combination thereof. Based on the analysis, the analyzer may create a set of candidate breaking changes that are candidates for breaking the project code if the project code were to migrate to using the updated component. In this way, a project developer can assess the ramifications of changing the project code to use the updated component, including issues that may arise as a result of using the updated component.

Figure 5:
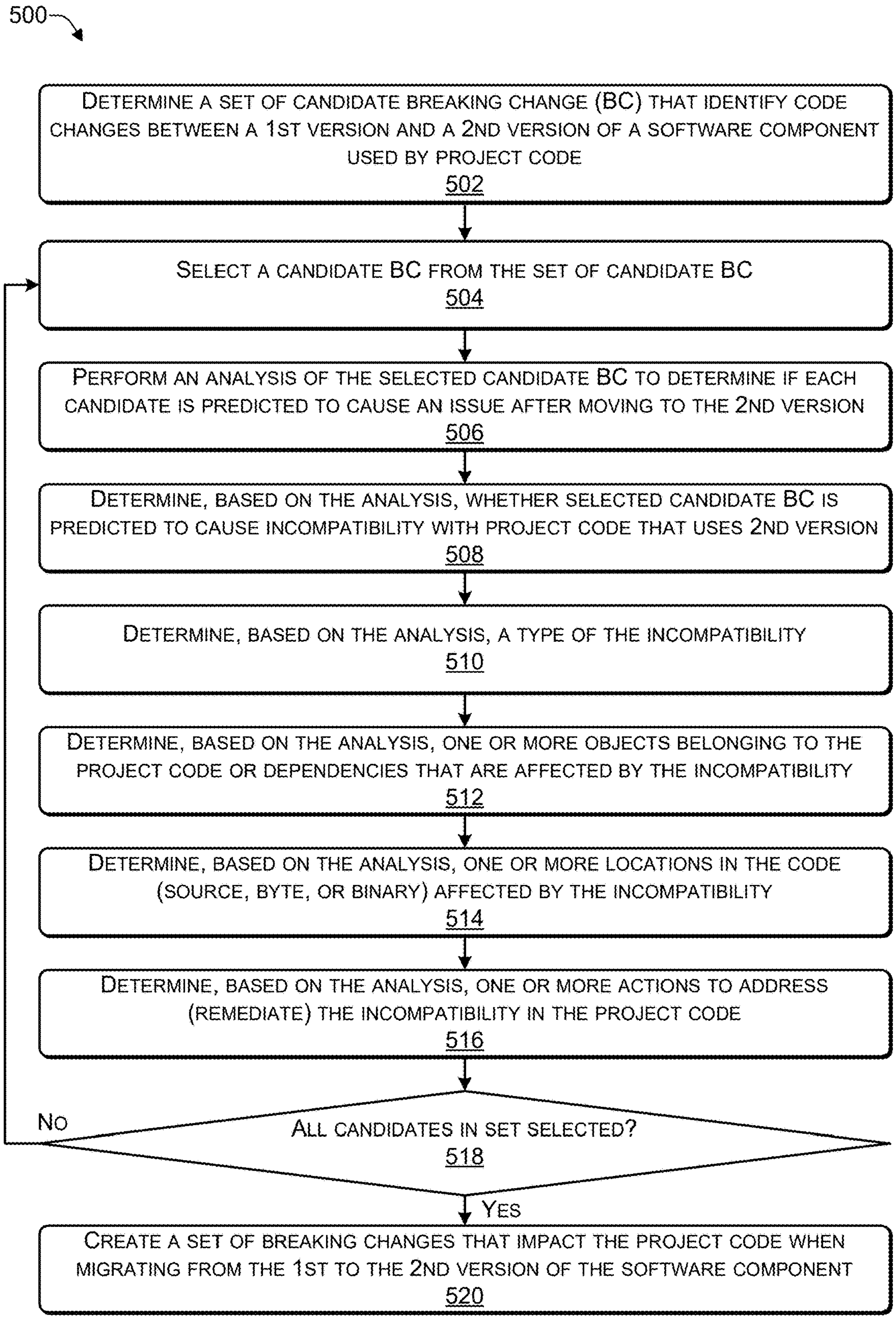
FIG. 5 is a flowchart of a process that includes evaluating candidate breaking changes in a set of candidate breaking changes, according to some embodiments.

FIG. 5 is a flowchart of a process 500 that includes evaluating candidate breaking changes in a set of candidate breaking changes, according to some embodiments. The process 500 may be performed by the analyzer 218 of FIGS. 1 and 2.

At 502, the process may determine a set of candidate breaking changes (BC) that identify code changes between a first and a second version of a software component used by project code. At 504, the process may select a candidate BC from the set of candidate BC's. At 506, the process may perform an analysis of the selected candidate BCs to determine if each candidate is predicted to cause an issue after moving to the second version of the software component. At 508, the process may determine, based on the analysis, whether the selected candidate BC is predicted to cause incompatibility with project code that uses a second version of the component. At 510, the process may determine, based on the analysis, a type of the incompatibility. At 512, the process may determine, based on the analysis, one or more objects belonging to the project code or dependencies, that are affected by the incompatibility. At 514, the process may determine, based on the analysis, one or more locations in the code (source, byte, or binary) affected by the incompatibility. At 516, the process may determine, based on the analysis, one or more actions to address (remediate) the incompatibility in the project code. At 518, the process may determine whether all candidates in the set of BC candidates have been selected. If the process determines, at 518, that all candidates in the set of BC candidates have not been selected, then the process proceeds back to 504 to select a next candidate BC from the set of candidate BCs. If the process determines, at 518, that all candidate BC in the set of candidate BCs have been selected, then the process creates a set of breaking changes that impact the project code when migrating from the first version to the second version of the software component.

For example, in FIG. 2, the analyzer 218 performs an analysis of each of the candidate BC 220 in the context of the project code 104 to determine an impact of each of the candidate BC 220 if the developer of the project code 104 plans to migrate from the component 204 (first version) to the updated component 122 (second version). The analyzer 218 analyzes the way the project code 104 and relationships 132 of the project code 104 uses the component 204, such as, for example, (i) how the code changed (e.g., code delta) from the component 204 to the updated component 122, (ii) how the code that changed (e.g., code delta) is used by the project code 104, (iii) the use of types, functions, and fields introduced by the updated component 122 that may affect the project code 104 and dependencies 128 (e.g., code that calls or is called by) the project code 104). The analyzer 218 takes as inputs (1) the project code 104 that directly and/or indirectly uses the component 204 (and is planning to migrate to use the updated component 122), (2) the component 204, (3) the updated component, and (4) the code of the other components 206 used both directly and indirectly by the project code 104. The analyzer 218 analyzes the type hierarchies 212 describing types defined in the project code 104 and relationships 132 (including dependencies to components in the third-party libraries 202, such as the component 204 and the updated component 122), as well as the relationships between the project code 104 and the relationships 132, such as, for example, class inheritance, interface implementation, method overrides, and the like. For example, a type definition of a class may include methods and fields, including modifiers, argument, return type, and the like. The analyzer 218 may construct and analyze global call graphs 214 describing all possible function invocations and field accesses that can take place when executing the project code 104. The call graphs 214 may be constructed dynamically, statically, or using any combination thereof. The analyzer 218 uses the inputs and the information obtained from the comparisons 210, the type hierarchies 212, the call graphs 214, and the functions 216 to (1) determine whether the project code 104 or the code of any of the relationships 132 (excluding the updated component 122) makes use of code that is subject to changes included in the set of candidate breaking changes 126 (e.g., outgoing uses) and (2) changes associated with each of the candidate BC 220 that relate to elements outside of the updated component 122 that can be satisfied by code in the project or its dependencies. The analyzer 218 performs this analysis by (1) traversing the type hierarchy 212(1), 212(2) and the call graph to search and examine types declared in the project code 104 and in the other components 206 that inherit or implement a type that has been changed in the updated component 122, analyzing the functions 216(1), 216(2) in the project code 104 and in the other components 206 that invoke a function that changed in the updated component 122 relative to the component 204, and analyzing the fields 217(1), 217(2) in the project code 104 and in the other components 206 that accesses a field that changed in the updated component 122 relative to the component 204.

The analyzer 218 may examine changed elements in the candidate breaking changes 126 between the component 204 and the updated component 122 to determine whether new or changed functions calls to functions 216 and accesses to fields 217 from reachable parts in the updated component 122 (according to the global call graph 214(2)) can be linked to functions 216 and fields 217 in the project code 104 and relationships 132. Based on the type hierarchies 212(1), 212(2), the analyzer 218 determines whether new and changed types that can be reached by the updated component 122 are compatible with types external to the updated component 122. The analyzer 218 determines whether the candidate BCs 220 associated with the changed type, function, or field is incompatible at a source code level, a binary (including bytecode) code level, a behavioral level, or any combination thereof. A source code level incompatibility and a binary or bytecode incompatibility may vary according to how the changed type, function or field is used. For example, in Java™, if a type of a field is narrowed from the component 204 to the updated component 122, then read-access to the field is source and binary (e.g., bytecode) compatible but write-access to the field is incompatible. As another example, the removal of a function (in the updated component 122) in a base class that has been overridden in a subclass is source incompatible if the @Override annotation is used, and compatible if the @Override annotation is not used. As can be seen from those examples, the language specific rules 222 determining incompatibility may vary from one programming language to another. In most languages, source compatibility does not imply binary compatibility and binary compatibility does not imply source compatibility. During analysis of the individual candidate BCs 220, the analyzer 218 may apply one or more techniques to determine whether the project developers should be notified about a particular candidate breaking change 220 that is predicted to induce a change in behavior in the updated component 122 relative to the component 204). An example of a technique to determine a change in behavior between the components 122, 204 may include determining a degree of change of a function body, expressed through distance measures, such as tree edit distances (e.g., determine over an abstract syntax tree (AST) representation) or textual function representations. Another example of a technique to determine a change in behavior between the components 122, 204, may include searching and interpretating release notes and documentation of the entire component, including types, functions, inline comments and the like to find indicators of semantic changes. A further example of a technique to determine a change in behavior between the components 122, 204 may include determining whether component types that are implemented or inherited in the project code 104 have changed, which can indicate semantic changes. Such techniques, along with particular thresholds for each technique, may be used to fine tune the capability of the analyzer to determine whether one of the candidate BC 220 is a breaking change that is to be included in the set of breaking changes 134.

Thus, an analyzer may determine a set of breaking changes that identify which candidate breaking changes are predicted to cause an incompatibility issue (breaking change) if project code is modified from using a current component (first version) to using an updated component (second version). Each breaking change provides information, such as, for example, (1) types of incompatibilities (e.g., source, binary, behavioral or any combination thereof), (2) an object affected by the incompatibility, where the object may belong to the project code or to one or more of the dependencies, (3) one or more locations of the affected source code location(s) affected, and remediation suggestions (if applicable). Note that source code incompatibility or binary code (include bytecode) incompatibility of the project code can be addressed by the project developers, whereas incompatibilities in other dependencies may be addressed by updating the affected component. In this way, a project code developer can modify the project code to address predicted breaking changes associated with using the updated component prior to releasing the project code, thereby avoiding the modified project code from breaking (not functioning as intended).

Figure 6:
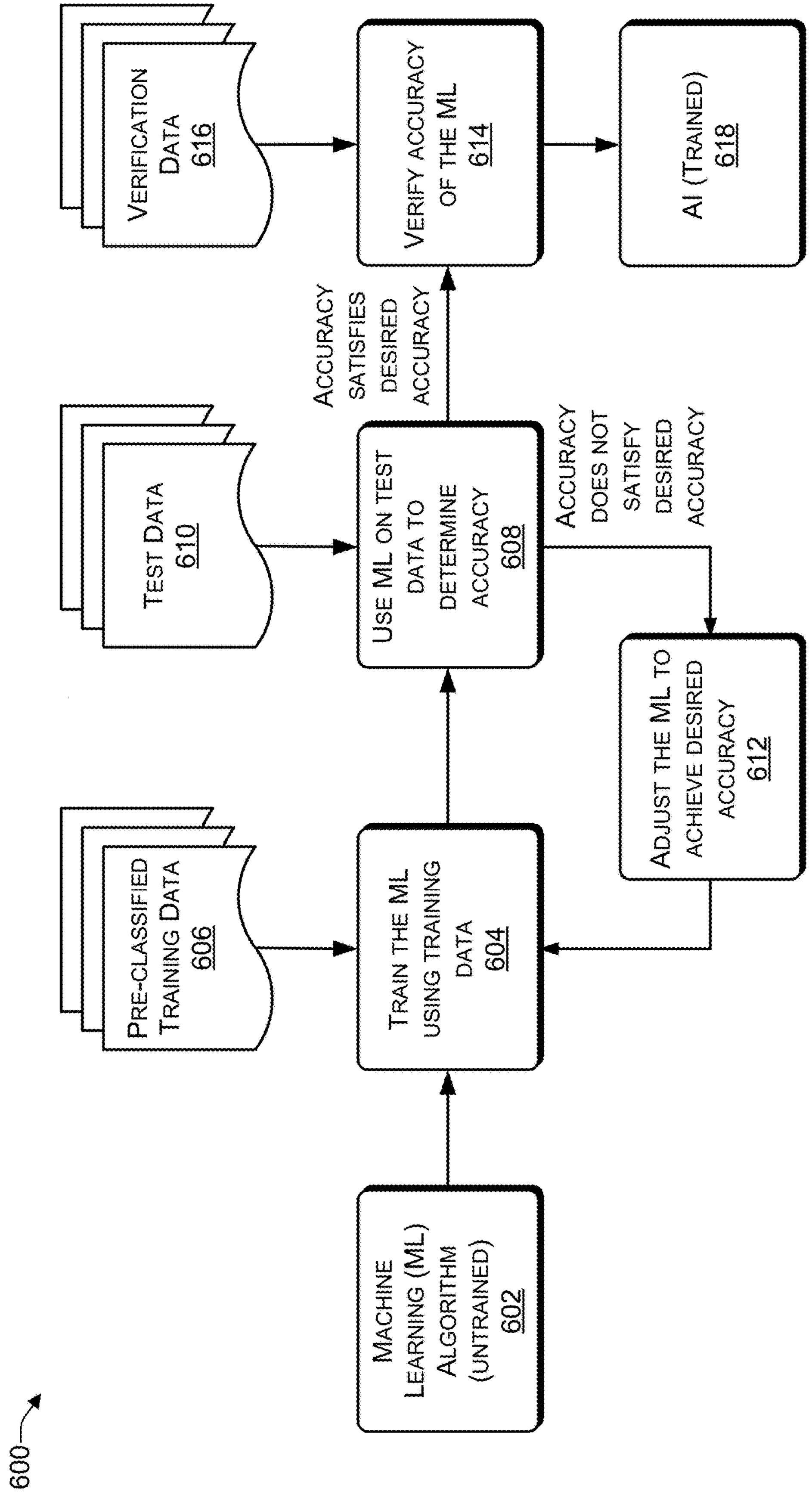
FIG. 6 is a flowchart of a process to train an artificial intelligence (AI) algorithm, according to some embodiments.

FIG. 6 is a flowchart of a process to train an artificial intelligence (AI) algorithm, according to some embodiments. For example, the process 600 may be performed by the computing device 700 of FIG. 7.

At 602, a machine learning algorithm (e.g., software code that has not yet been trained) may be created by one or more software designers. At 604, the machine learning algorithm may be trained using pre-classified training data 606 (e.g., a portion of the training data 112 that has been pre-classified). For example, the training data 606 may have been pre-classified by humans, by machine learning, or a combination of both. After the machine learning has been trained using the pre-classified training data 606, the machine learning may be tested, at 608, using test data 610 to determine an accuracy of the machine learning. For example, in the case of a classifier, the accuracy of the classification may be determined using the test data 610.

If an accuracy of the machine learning does not satisfy a desired accuracy (e.g., 95%, 98%, 99% accurate), at 608, then the machine learning code may be modified (e.g., adjusted), at 612, to achieve the desired accuracy. For example, at 612, the software designers may modify the machine learning software code to improve the accuracy of the machine learning algorithm. After the machine learning has been tuned, at 612, the machine learning may be retrained, at 604, using the pre-classified training data 606. In this way, 604, 608, 612 may be repeated until the machine learning is able to classify the test data 610 with the desired accuracy.

After determining, at 608, that an accuracy of the machine learning satisfies the desired accuracy, the process may proceed to 614, where verification data 616 may be used to verify an accuracy of the machine learning. After the accuracy of the machine learning is verified, at 614, an AI 618 (e.g., the breaking change predictor 124 of FIG. 1), which has been trained to predict candidate breaking changes 220 and breaking changes 224 of FIG. 2.

Figure 7:
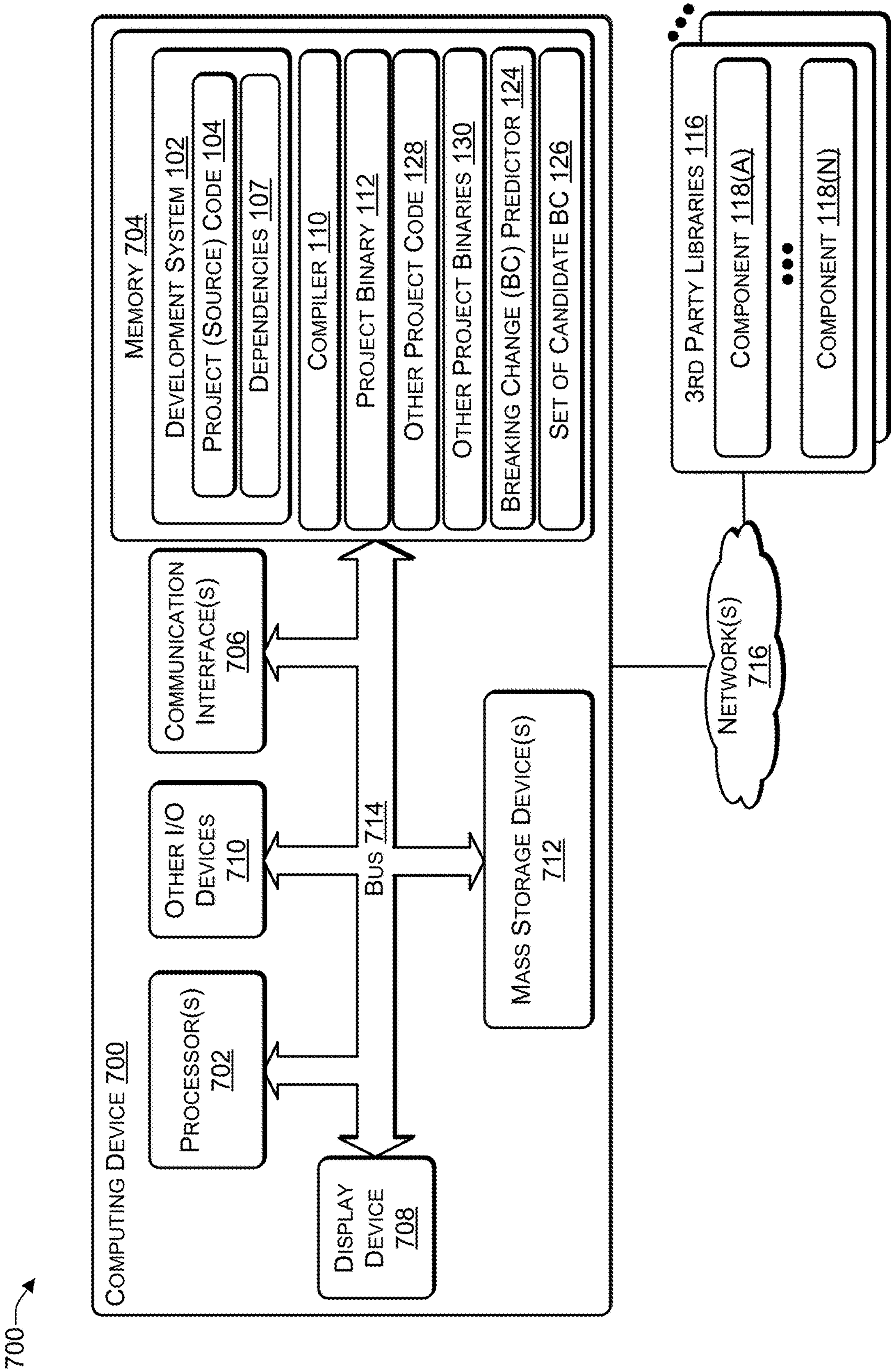
FIG. 7 illustrates an example configuration of a computing device that can be used to implement the systems and techniques described herein.

FIG. 7 illustrates an example configuration of a computing device that can be used to implement the systems and techniques described herein, such as hosting the development system 102 of FIG. 1. The computing device 700 may include one or more processors 702 (e.g., central processing unit (CPU), graphics processing unit (GPU), or the like), a memory 704, communication interfaces 706, a display device 708, other input/output (I/O) devices 710 (e.g., keyboard, trackball, and the like), and one or more mass storage devices 712 (e.g., disk drive, solid state disk drive, or the like), configured to communicate with each other, such as via one or more system buses 714 or other suitable connections. While a single system bus 714 is illustrated for ease of understanding, it should be understood that the system buses 714 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), High-Definition Multimedia Interface (HDMI), and the like), power buses, etc.

The processors 702 are one or more hardware devices that may include a single processing unit or a number of processing units, all of which may include single or multiple computing units or multiple cores. The processors 702 may include a GPU that is integrated into the CPU or the GPU may be a separate processor device from the CPU. The processors 702 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 702 are configured to fetch and execute computer-readable instructions stored in the memory 704, mass storage devices 712, and other types of non-transitory computer-readable media.

Memory 704 and mass storage devices 712 are examples of non-transitory computer storage media (e.g., memory storage devices) for storing instructions that can be executed by the processors 702 to perform the various functions described herein. For example, memory 704 may include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., compact disc (CD), digital versatile disc (DVD)), a storage array, a network attached storage, a storage area network, or the like. Both memory 704 and mass storage devices 712 may be collectively referred to as memory or computer storage media herein and include any type of non-transitory media capable of storing computer-readable, processor-executable program instructions as computer program code that can be executed by the processors 702 as a particular machine configured for carrying out the operations and functions described in the implementations herein.

The computing device 700 may include one or more communication interfaces 706 for exchanging data via the network(s) 106. The communication interfaces 706 can facilitate communications within a wide variety of networks and protocol types, such as a representative network 716 that may include wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 706 can also provide communication with external storage, such as a storage array, network attached storage, storage area network, cloud storage, or the like.

The display device 708 may be used for displaying content (e.g., information and images) to users. Other I/O devices 710 may be devices that receive various inputs from a user and provide various outputs to the user, and may include a keyboard, a touchpad, a mouse, a printer, audio input/output devices, and so forth.

The computer storage media, such as memory 704 and mass storage devices 712, may be used to store software and data as shown in FIG. 7.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

determining, by one or more processors, that project code in a development system calls a component in a third-party library, wherein the component is in a compiled form;

determining, by the one or more processors, that the component has been updated to create an updated component in the third-party library, wherein the updated component is in the compiled form;

performing, by the one or more processors, a type hierarchy comparison of:

a first type hierarchy associated with the component; and a second type hierarchy associated with the updated component;

performing, by the one or more processors, a call graph comparison of:

a first call graph associated with the component; and a second call graph associated with the updated component;

performing, by the one or more processors, a function comparison of:

a first set of functions called by the component; and a second set of functions called by the updated component, wherein the first set of functions and the second set of functions include directly called functions and transitively called functions;

performing, by the one or more processors, a field comparison of:

a first set of fields accessed by the component; and a second set of fields accessed by the updated component, wherein the first set of fields and the second set of fields include directly accessed fields and transitively accessed fields; and determining, by the one or more processors and based at least in part on:

the type hierarchy comparison, the call graph comparison, the function comparison, and the field comparison, a set of breaking changes associated with the updated component, each breaking change in the set of breaking changes identifying changes to the updated component, relative to the component, that are determined to cause an incompatibility when the project code calls the updated component;

wherein the project code is modified to create modified project code that does not include a breaking change from the set of breaking changes.

2. The method of claim 1, further comprising:

determining a source compatibility between the component and the updated component;

determining a binary compatibility between the component and the updated component;

determining a behavioral compatibility between the component and the updated component; or any combination thereof.

3. The method of claim 2, further comprising:

determining the source compatibility using a compiler;

determining the binary compatibility using a virtual machine;

determining the behavioral compatibility at runtime by determining whether the updated component exhibits a behavior that is different from a previous behavior of a previous version of the updated component without causing compilation or linkage errors; or any combination thereof.

4. The method of claim 1, wherein performing the type hierarchy comparison comprises:

traversing the first type hierarchy;

traversing the second type hierarchy; and identifying, based on traversing the first type hierarchy and the second type hierarchy, one or more types that inherit or implement at least one type that changed from the component to the updated component.

5. The method of claim 1, wherein performing the call graph comparison comprises:

traversing the first call graph;

traversing the second call graph; and identifying, based on traversing the first call graph and the second call graph, at least one function, included in the updated component, that changed from the component to the updated component.

6. The method of claim 1, wherein performing the call graph comparison comprises:

traversing the first call graph;

traversing the second call graph; and identifying at least one function, called by the updated component, that changed from the component to the updated component.

7. The method of claim 1, wherein performing the call graph comparison comprises:

traversing the first call graph;

traversing the second call graph; and identifying at least one field, accessed by the updated component, that changed from the component to the updated component.

8. A server comprising:

one or more processors; and one or more non-transitory computer readable media storing instructions executable by the one or more processors to perform operations comprising:

determining that project code in a development system calls a component in a third-party library, wherein the component is in a compiled form;

determining that the component has been updated to create an updated component in the third-party library, wherein the updated component is in the compiled form;

performing a type hierarchy comparison of:

a first type hierarchy associated with the component; and a second type hierarchy associated with the updated component;

performing a call graph comparison of:

a first call graph associated with the component; and a second call graph associated with the updated component;

performing a function comparison of:

a first set of functions called by the component; and a second set of functions called by the updated component, wherein the first set of functions and the second set of functions include directly called functions and transitively called functions;

performing a field comparison of:

a first set of fields accessed by the component; and a second set of fields accessed by the updated component, wherein the first set of fields and the second set of fields include directly accessed fields and transitively accessed fields; and determining, based at least in part on:

the type hierarchy comparison, the call graph comparison, the function comparison, and the field comparison, a set of breaking changes associated with the updated component, each breaking change in the set of breaking changes identifying changes to the updated component, relative to the component, that are determined to cause an incompatibility when the project code calls the updated component;

wherein the project code is modified to create modified project code that does not include a breaking change from the set of breaking changes.

9. The server of claim 8, wherein performing the call graph comparison comprises:

comparing a package call graph of the component and the updated component;

comparing a global call graph of the component and the updated component; or any combination thereof.

10. The server of claim 8, wherein the incompatibility comprises:

a source code incompatibility;

a binary incompatibility;

a behavioral incompatibility; or any combination thereof.

11. The server of claim 8, wherein the project code comprises:

a plurality of types that are explicitly defined and implicitly inherited; and a plurality of relationships that are explicitly defined and implicitly inherited.

12. The server of claim 8, wherein performing the field comparison comprises:

determining changes, between the component and the updated component, to particular fields accessible to the updated component; and determining whether the changes to the fields are linked to particular fields in the project or in project dependencies.

13. The server of claim 8, further comprising:

determining a set of reachable types in the updated component;

performing a comparison of changes in the updated component relative to the component; and determining, based on the comparison, whether new types or changed types in the set of reachable types are compatible with external types associated with the updated component.

14. The server of claim 8, the operations further comprising:

for each breaking change in the set of breaking changes:

determining one or more locations in the project code affected by the incompatibility; and determining one or more actions to perform to address the incompatibility.

15. One or more non-transitory computer readable media storing instructions executable by one or more processors to perform operations comprising:

determining that project code in a development system calls a component in a third-party library, wherein the component is in a compiled form;

determining that the component has been updated to create an updated component in the third-party library, wherein the updated component is in the compiled form;

performing a type hierarchy comparison of:

a first type hierarchy associated with the component; and a second type hierarchy associated with the updated component;

performing a call graph comparison of:

a first call graph associated with the component; and a second call graph associated with the updated component;

performing a function comparison of:

a first set of functions called by the component; and a second set of functions called by the updated component, wherein the first set of functions and the second set of functions include directly called functions and transitively called functions;

performing a field comparison of:

a first set of fields accessed by the component; and a second set of fields accessed by the updated component, wherein the first set of fields and the second set of fields include directly accessed fields and transitively accessed fields; and determining, based at least in part on:

the type hierarchy comparison, the call graph comparison, the function comparison, and the field comparison, a set of breaking changes associated with the updated component, each breaking change in the set of breaking changes identifying changes to the updated component, relative to the component, that are determined to cause an incompatibility when the project code calls the updated component;

wherein the project code is modified to create modified project code that does not include a breaking change from the set of breaking changes.

16. The one or more non-transitory computer readable media of claim 15, wherein the incompatibility comprises:

an incoming incompatibility due to an incoming call;

an outgoing incompatibility due to an outgoing call; or both.

17. The one or more non-transitory computer readable media of claim 15, wherein performing the type hierarchy comparison comprises:

traversing the first type hierarchy;

traversing the second type hierarchy; and identifying, based on traversing the first type hierarchy and the second type hierarchy, one or more types that inherit or implement at least one type that changed from the component to the updated component.

18. The one or more non-transitory computer readable media of claim 15, wherein performing the call graph comparison comprises:

traversing the first call graph;

traversing the second call graph; and identifying, based on traversing the first call graph and the second call graph, at least one function, included in the updated component, that changed from the component to the updated component.

19. The one or more non-transitory computer readable media of claim 15, further comprising:

determining a set of reachable types in the updated component;

performing a comparison of changes in the updated component relative to the component; and determining, based on the comparison of the changes, whether new types or changed types in the set of reachable types are compatible with external types associated with the updated component.

20. The one or more non-transitory computer readable media of claim 15, the operations further comprising:

for each breaking change in the set of breaking changes:

determining one or more locations in the project code affected by the incompatibility; and determining one or more actions to perform to address the incompatibility.

* * * * *